(12) United States Patent
Portilla

(10) Patent No.: US 10,378,268 B2
(45) Date of Patent: Aug. 13, 2019

(54) BUILDING SECURITY ASSEMBLY

(71) Applicant: Jose Portilla, Houston, TX (US)

(72) Inventor: Jose Portilla, Houston, TX (US)

( * ) Notice: Subject to any disclaimer, the term of this patent is extended or adjusted under 35 U.S.C. 154(b) by 4 days.

(21) Appl. No.: 15/865,366

(22) Filed: Jan. 9, 2018

(65) Prior Publication Data
US 2019/0211610 A1 Jul. 11, 2019

(51) Int. Cl.
| | | |
|---|---|---|
| *E05G 5/02* | (2006.01) | |
| *E06B 5/10* | (2006.01) | |
| *E04H 9/04* | (2006.01) | |
| *E05B 47/00* | (2006.01) | |
| *H04N 7/18* | (2006.01) | |
| *B05B 12/12* | (2006.01) | |
| *B05B 1/16* | (2006.01) | |
| *G01V 3/08* | (2006.01) | |
| *E05G 5/00* | (2006.01) | |

(52) U.S. Cl.
CPC .......... *E05G 5/02* (2013.01); *B05B 1/16* (2013.01); *B05B 12/122* (2013.01); *E04H 9/04* (2013.01); *E05B 47/00* (2013.01); *E05G 5/003* (2013.01); *E06B 5/10* (2013.01); *E06B 5/106* (2013.01); *G01V 3/08* (2013.01); *H04N 7/181* (2013.01)

(58) Field of Classification Search
CPC .. E05G 5/02; E05G 5/003; G01V 3/08; B05B 1/16; B05B 12/122; H04N 7/181; E05B 47/00; E04H 9/04; E06B 5/10; E06B 5/106
USPC .......... 109/6, 7, 8, 20, 29–34, 67, 68; 49/68
See application file for complete search history.

(56) References Cited

U.S. PATENT DOCUMENTS

| | | | | |
|---|---|---|---|---|
| 3,779,178 | A * | 12/1973 | Riseley, Jr. | E05G 5/02 109/35 |
| 4,481,887 | A * | 11/1984 | Urbano | E05G 5/02 109/3 |
| 4,586,441 | A | 5/1986 | Zekich | |
| 4,656,954 | A * | 4/1987 | Tonali | E05G 5/003 109/6 |
| 4,741,275 | A * | 5/1988 | Lewiner | G07C 9/00103 109/59 R |
| 4,841,752 | A * | 6/1989 | Fletcher | E05G 1/12 109/20 |
| 4,867,076 | A * | 9/1989 | Marcone | E05G 5/00 109/20 |
| 5,195,448 | A * | 3/1993 | Sims | E05G 5/02 109/31 |
| 5,311,166 | A * | 5/1994 | Frye | G08B 15/00 109/20 |
| 5,694,867 | A * | 12/1997 | Diaz-Lopez | E05G 5/003 109/6 |

(Continued)

*Primary Examiner* — Lloyd A Gall

(57) ABSTRACT

A building security assembly includes a vestibule that may be attached to an entrance of an institution and the vestibule has an entrance and an exit. A first door is hingedly coupled to the vestibule to open and close the entrance. A second door is hingedly coupled to the vestibule to open and close the exit. A metal detection array is positioned within the vestibule to detect metal components of a firearm. A security unit is coupled to the vestibule and is in electrical communication with the metal detection array. The security unit locks each of the first and second doors when the metal detection array detects the metal components of the firearm to inhibit the individual from bringing the firearm into the institution.

7 Claims, 5 Drawing Sheets

(56) References Cited

U.S. PATENT DOCUMENTS

| | | | | |
|---|---|---|---|---|
| 5,992,094 | A * | 11/1999 | Diaz | .......................... E05G 5/02 |
| | | | | 109/6 |
| 6,298,603 | B1 | 10/2001 | Diaz | |
| 6,308,644 | B1 * | 10/2001 | Diaz | ....................... E05G 5/003 |
| | | | | 109/6 |
| 6,484,650 | B1 * | 11/2002 | Stomski | .................... E05G 5/02 |
| | | | | 109/6 |
| 6,745,520 | B2 * | 6/2004 | Puskaric | ................. E05G 5/003 |
| | | | | 49/142 |
| 8,171,864 | B2 * | 5/2012 | Mucio | ..................... E05G 5/003 |
| | | | | 109/3 |
| 8,378,988 | B1 | 2/2013 | Artino et al. | |
| 8,499,494 | B2 | 8/2013 | Robert, Jr. | |

* cited by examiner

BUILDING SECURITY ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to security devices and more particularly pertains to a new security device for detecting a firearm in an entrance to a building and detaining the individual carrying the firearm.

BRIEF SUMMARY OF THE INVENTION

An embodiment of the disclosure meets the needs presented above by generally comprising a vestibule that may be attached to an entrance of an institution and the vestibule has an entrance and an exit. A first door is hingedly coupled to the vestibule to open and close the entrance. A second door is hingedly coupled to the vestibule to open and close the exit. A metal detection array is positioned within the vestibule to detect metal components of a firearm. A security unit is coupled to the vestibule and is in electrical communication with the metal detection array. The security unit locks each of the first and second doors when the metal detection array detects the metal components of the firearm to inhibit the individual from bringing the firearm into the institution.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
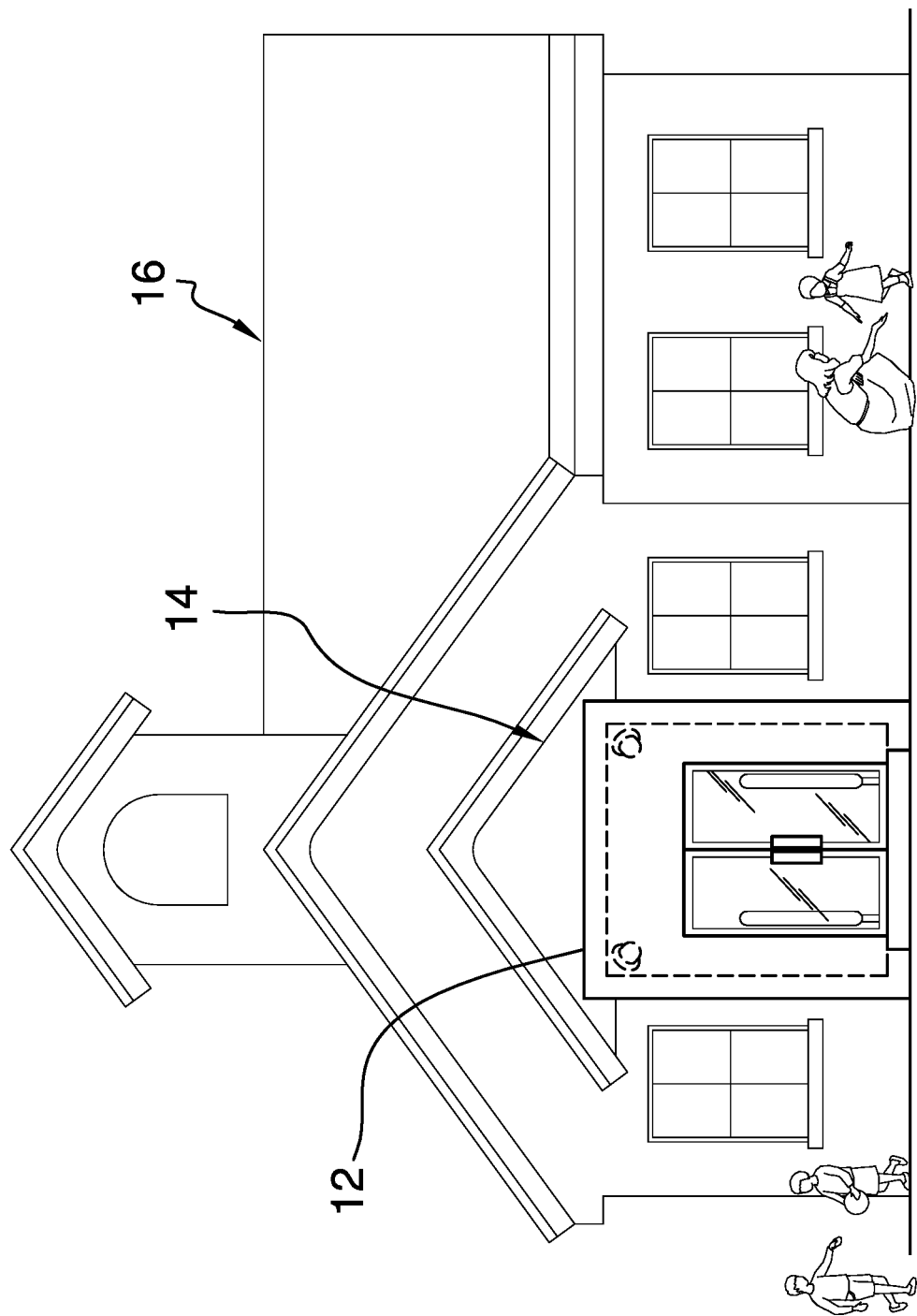
FIG. 1 is a perspective in-use view of a building security assembly according to an embodiment of the disclosure.
Figure 2:
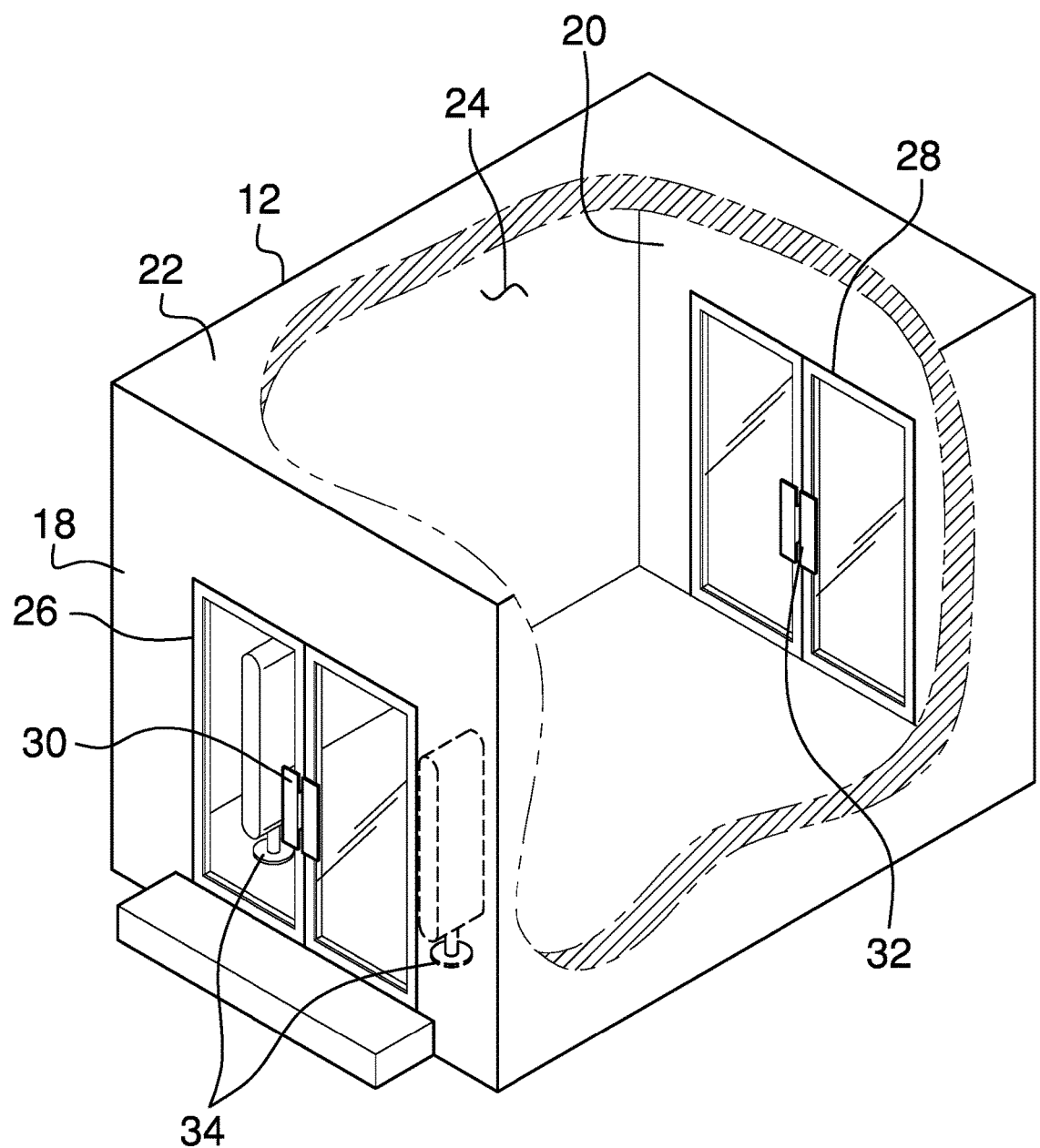
FIG. 2 is a perspective cut-away view of vestibule of an embodiment of the disclosure.
Figure 3:
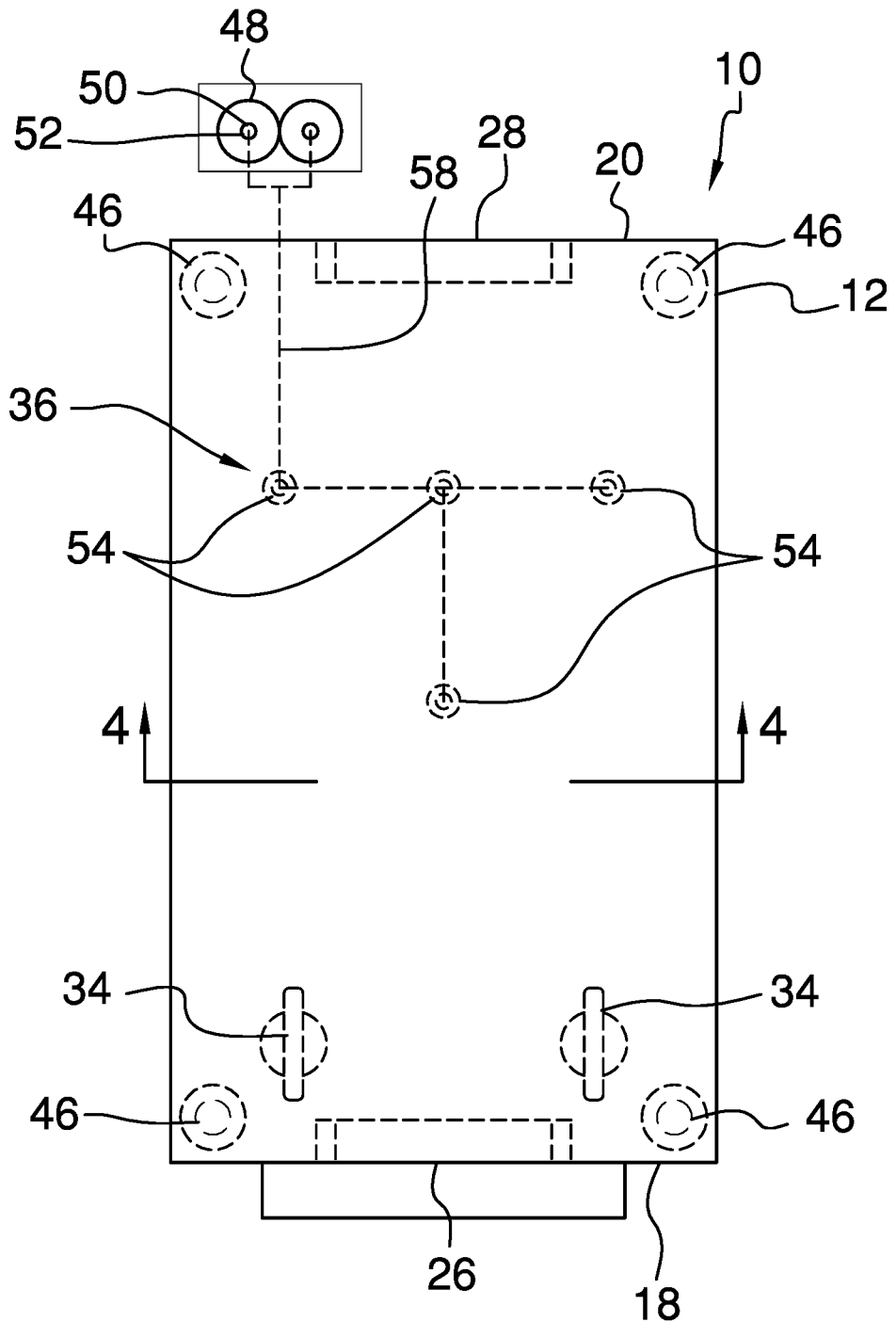
FIG. 3 is a top phantom view of vestibule of an embodiment of the disclosure.
Figure 4:
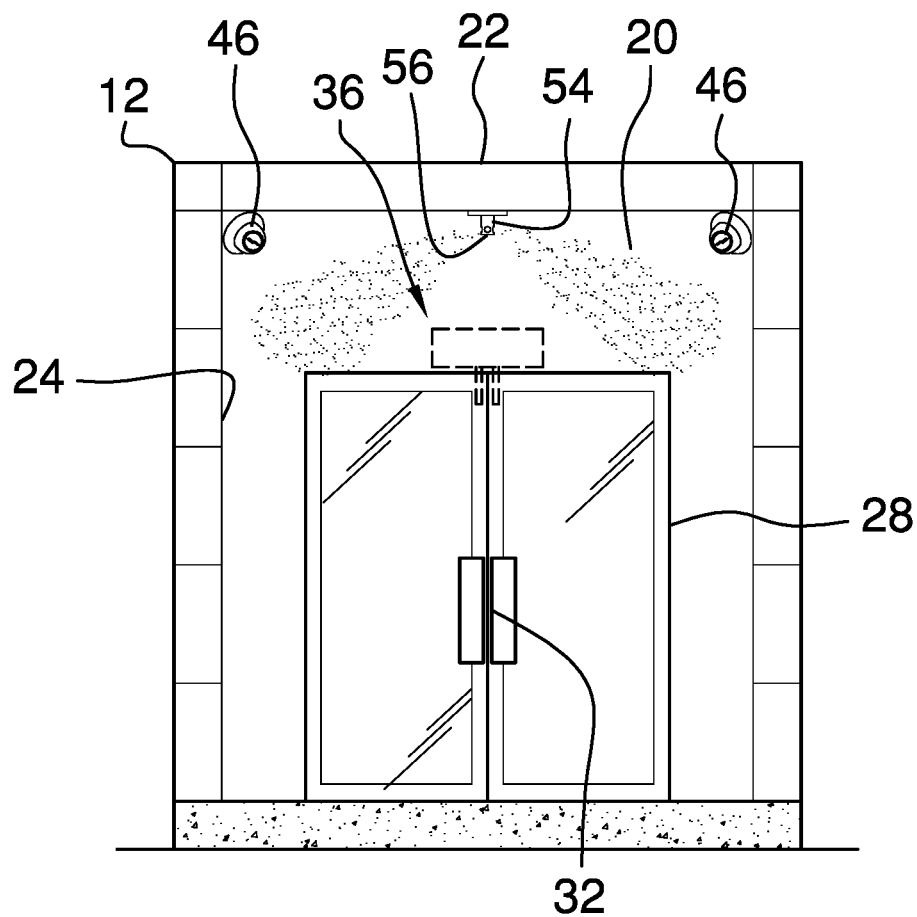
FIG. 4 is a cross sectional view taken along line 4-4 of FIG. 3 of an embodiment of the disclosure.
Figure 5:
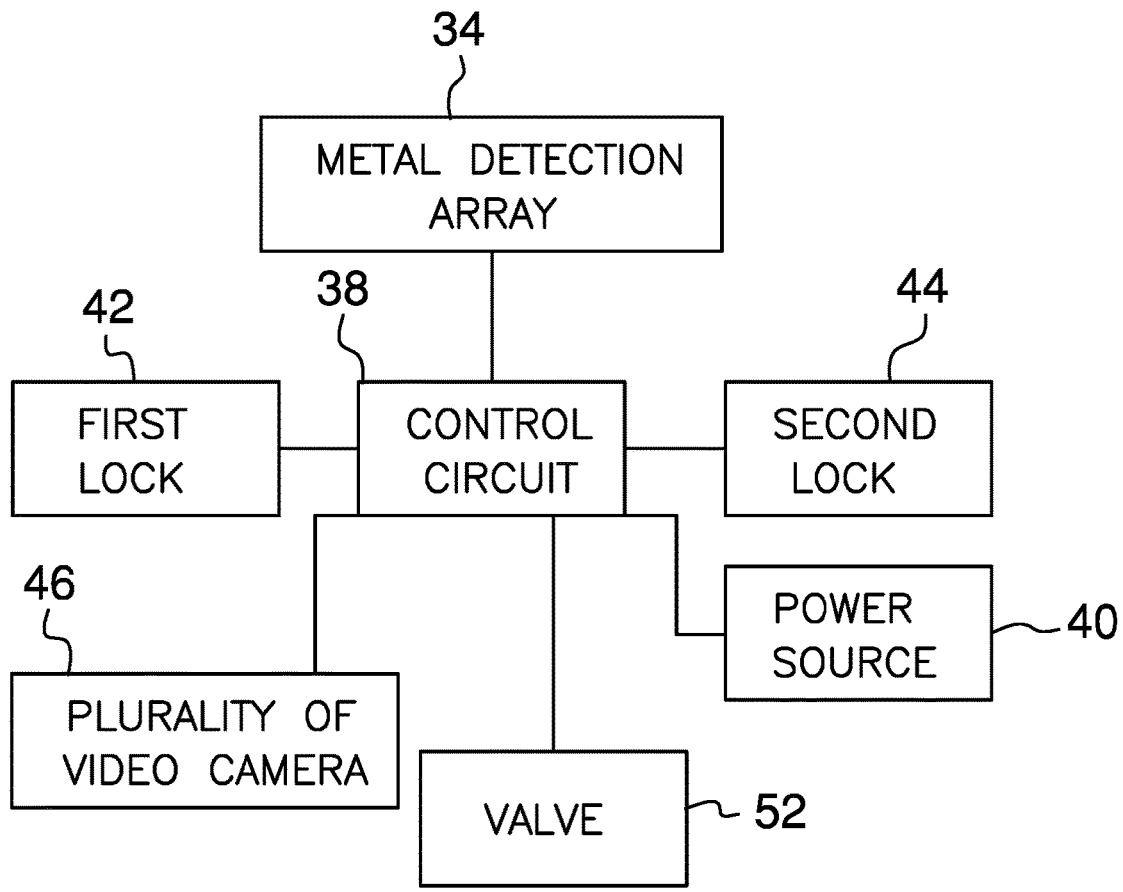
FIG. 5 is a schematic view of an embodiment of the disclosure.

With reference now to the drawings, and in particular to FIGS. 1 through 5 thereof, a new security device embodying the principles and concepts of an embodiment of the disclosure and generally designated by the reference numeral 10 will be described.

As best illustrated in FIGS. 1 through 5, the building security assembly 10 generally comprises a vestibule 12 that is attached to an entrance 14 of an institution 16. The institution 16 may be a public school, a post office, an office building and any other public building. The vestibule 12 has a front wall 18, a back wall 20 and an outer wall 22 extending therebetween and the outer wall 22 has an inside surface 24. The vestibule 12 is comprised of a bullet resistant material ranging between 7.0 mm and 75.0 mm thick. The front wall 18 has an entrance 26 extending into the vestibule 12 and the back wall 20 has an exit 28 extending into the vestibule 12. The exit 28 is aligned with the entrance 26 of the institution 16.

A first door 30 is hingedly coupled to the vestibule 12 and the first door 30 is comprised of a bullet resistant material. The first door 30 is aligned with the entrance 26 in the front wall 18 such that the first door 30 opens and closes the entrance 26. A second door 32 is hingedly coupled to the vestibule 12 and the second door 32 is comprised of a bullet resistant material. The second door 32 is aligned with the exit 28 such that the second door 32 opens and closes the exit 28.

A metal detection array 34 is positioned within the vestibule 12 to detect metal components of a firearm and any other metal object. The metal detection array 34 is positioned to surround the entrance 26. In this way the metal detection array 34 can detect the metal components of a firearm on an individual who enters the vestibule 12. The metal detection array 34 may comprise a metal detection unit such as is employed by TSA checkpoints and other metal detection units employed to screen individuals for weapons.

A security unit 36 is coupled to the vestibule 12 and the security unit 36 is in electrical communication with the metal detection array 34. The security unit 36 locks each of the first door 30 and the second door 32 when the metal detection array 34 detects the metal components of the firearm. In this way the security unit 36 inhibits the individual from bringing the firearm into the institution 16. Additionally, the security unit 36 selectively releases a sleep agent comprising a gas into the vestibule 12 to subdue the individual carrying the firearm.

The security unit 36 comprises a control circuit 38 that is positioned within the vestibule 12 and the metal detection array 34 is electrically coupled to the control circuit 38. The control circuit 38 is electrically coupled to a power source 40 comprising an electrical system of the institution 16. A first lock 42 is coupled to the first door 30 and the first lock 42 is electrically coupled to the control circuit 38. The first lock 42 locks the first door 30 when the first lock 42 is turned on. Moreover, the control circuit 38 turns the first lock 42 on when the metal detection array 34 detects the metal component of the firearm.

A second lock 44 is coupled to the second door 32 and the second lock 44 is electrically coupled to the control circuit 38. The second lock 44 locks the second door 32 when the second lock 44 is turned on. The control circuit 38 turns the second lock 44 on when the metal detection array 34 detects the metal component of the firearm. Each of the first lock 42 and the second lock 44 may be electrically actuated locks of any conventional design. A plurality of video cameras 46 is provided and each of the video cameras 46 is positioned within the vestibule 12 to record video of the individual. Each of the video cameras 46 is electrically coupled to the control circuit 38 and each of the video cameras 46 may comprise digital video cameras 46 or the like. Additionally, each of the video cameras 46 may be electrically coupled to an electronic memory, said as a hard disk drive or the like, to store the video that is recorded.

A tank 48 is provided that contains the sleep agent and the tank 48 is positioned remotely with respect to the vestibule 12. The tank 48 has an outlet 50 and the tank 48 may be a compressed gas tank or the like that stores sleep agent under pressure. A valve 52 is fluidly coupled to the outlet 50 and the valve 52 is electrically coupled to the control circuit 38. The valve 52 releases the sleep agent from the outlet 50 when the valve 52 is turned on. Additionally, the control circuit 38 turns the valve 52 on when the metal detection array 34 detects the metal components of the firearm. The valve 52 may be an electrically actuated fluid valve 52 or the like.

A plurality of nozzles 54 is provided and each of the nozzles 54 is coupled to the inside surface 24 of the outer wall 22 of the vestibule 12. Each of the nozzle has a distal end 56 with respect to the outer wall 22 and the distal end 56 corresponding each of the nozzles 54 is open. A conduit 58 is fluidly coupled between the valve 52 and each of the nozzles 54 such that each of the nozzles 54 is in fluid communication with the tank 48. The sleep agent is released from the distal end 56 corresponding to each of the nozzles 54 when the valve 52 is turned on.

In use, the individual passes through the entrance 26 and enters the vestibule 12 when the individual intends to enter the institution 16. The metal detection array 34 scans the individual for the metal components of the firearm and other metal objects. The control circuit 38 turns on each of the first lock 42 and the second lock 44 when the metal detection array 34 detects metal. Thus, the individual is inhibited from bringing the metal object into the institution 16 and the individual is inhibited from leaving the vestibule 12. Additionally, the sleep agent is selectively released into the vestibule 12 to subdue the individual. In this way the occupants of the institution 16 are protected from a potential shooter or other threat from an armed individual. The individual is detained in the vestibule 12 until authorities arrive to arrest the individual.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A building security assembly being configured to inhibit an individual from bringing a weapon into an institution, said assembly comprising:
  a vestibule being configured to be attached to an entrance of an institution, said vestibule having an entrance and an exit, said vestibule having a front wall, a back wall and an outer wall extending therebetween, said outer wall having an inside surface, said vestibule being comprised of a bullet resistant material, said front wall having said entrance extending into said vestibule, said back wall having said exit extending into said vestibule, said exit being configured to be aligned with the entrance of the institution;
  a first door being hingedly coupled to said vestibule, said first door being comprised of a bullet resistant material, said first door being aligned with said entrance such that said first door opens and closes said entrance;
  a second door being hingedly coupled to said vestibule, said second door being comprised of a bullet resistant material, said second door being aligned with said exit such that said second door opens and closes said exit;
  a metal detection array being positioned within said vestibule wherein said metal detection array is configured to detect metal components of a firearm, said metal detection array being positioned to surround said entrance wherein said metal detection array is configured to detect the metal components of a firearm on an individual who enters said vestibule; and
  a security unit being coupled to said vestibule, said security unit being in electrical communication with said metal detection array, said security unit locking each of said first door and said second door when said metal detection array detects the metal components of the firearm wherein said security unit is configured to inhibit the individual from bringing the firearm into the institution, said security unit selectively releasing a sleep agent comprising a gas into said vestibule wherein said security unit is configured to subdue the individual, said security unit comprising a control circuit being positioned within said vestibule, said metal detection array being electrically coupled to said control circuit, said control circuit being electrically coupled to a power source comprising an electrical system of the institution, a tank containing said sleep agent, said tank being positioned remotely with respect to said vestibule, said tank having an outlet, and a valve being fluidly coupled to said outlet, said valve being electrically coupled to said control circuit, said valve releasing said sleep agent from said outlet when said valve is turned on, said control circuit turning said valve on when said metal detection array detects the metal components of the firearm.

2. The assembly according to claim 1, further comprising a first lock being coupled to said first door, said first lock being electrically coupled to said control circuit, said first lock locking said first door when said first lock is turned on, said control circuit turning said first lock on when said metal detection array detects the metal component of the firearm.

3. The assembly according to claim 2, further comprising a second lock being coupled to said second door, said second lock being electrically coupled to said control circuit, said second lock locking said second door when said second lock is turned on, said control circuit turning said second lock on when said metal detection array detects the metal component of the firearm.

4. The assembly according to claim 1, further comprising a plurality of video cameras, each of said video cameras being positioned within said vestibule wherein each of said video cameras is configured to record video of the individual, each of said video cameras being electrically coupled to said control circuit.

5. The assembly according to claim 1, further comprising a plurality of nozzles, each of said nozzles being coupled to said inside surface of said outer wall of said vestibule, each of said nozzles having a distal end with respect to said outer wall, said distal end corresponding to each of said nozzles being open.

6. The assembly according to claim 5, further comprising a conduit being fluidly coupled between said valve and each of said nozzles such that each of said nozzles is in fluid communication with said tank, said sleep agent being released from said distal end corresponding to each of said nozzles when said valve is turned on.

7. A building security assembly being configured to inhibit an individual from bringing a weapon into an institution, said assembly comprising:

a vestibule being configured to be attached to an entrance of an institution, said vestibule having a front wall, a back wall and an outer wall extending therebetween, said outer wall having an inside surface, said vestibule being comprised of a bullet resistant material, said front wall having an entrance extending into said vestibule, said back wall having an exit extending into said vestibule, said exit being configured to be aligned with the entrance of the institution;

a first door being hingedly coupled to said vestibule, said first door being comprised of a bullet resistant material, said first door being aligned with said entrance such that said first door opens and closes said entrance;

a second door being hingedly coupled to said vestibule, said second door being comprised of a bullet resistant material, said second door being aligned with said exit such that said second door opens and closes said exit;

a metal detection array being positioned within said vestibule wherein said metal detection array is configured to detect metal components of a firearm, said metal detection array being positioned to surround said entrance wherein said metal detection array is configured to detect the metal components of a firearm on an individual who enters said vestibule; and a security unit being coupled to said vestibule, said security unit being in electrical communication with said metal detection array, said security unit locking each of said first door and said second door when said metal detection array detects the metal components of the firearm wherein said security unit is configured to inhibit the individual from bringing the firearm into the institution, said security unit selectively releasing a sleep agent comprising a gas into said vestibule wherein said security unit is configured to subdue the individual, said security unit comprising:

a control circuit being positioned within said vestibule, said metal detection array being electrically coupled to said control circuit, said control circuit being electrically coupled to a power source comprising an electrical system of the institution;

a first lock being coupled to said first door, said first lock being electrically coupled to said control circuit, said first lock locking said first door when said first lock is turned on, said control circuit turning said first lock on when said metal detection array detects the metal component of the firearm;

a second lock being coupled to said second door, said second lock being electrically coupled to said control circuit, said second lock locking said second door when said second lock is turned on, said control circuit turning said second lock on when said metal detection array detects the metal component of the firearm;

a plurality of video cameras, each of said video cameras being positioned within said vestibule wherein each of said video cameras is configured to record video of the individual, each of said video cameras being electrically coupled to said control circuit;

a tank containing said sleep agent, said tank being positioned remotely with respect to said vestibule, said tank having an outlet;

a valve being fluidly coupled to said outlet, said valve being electrically coupled to said control circuit, said valve releasing said sleep agent from said outlet when said valve is turned on, said control circuit turning said valve on when said metal detection array detects the metal components of the firearm;

a plurality of nozzles, each of said nozzles being coupled to said inside surface of said outer wall of said vestibule, each of said nozzles having a distal end with respect to said outer wall, said distal end corresponding to each of said nozzles being open; and a conduit being fluidly coupled between said valve and each of said nozzles such that each of said nozzles is in fluid communication with said tank, said sleep agent being released from said distal end corresponding to each of said nozzles when said valve is turned on.

\* \* \* \* \*